United States Patent
Klaiber et al.

(10) Patent No.: US 9,547,602 B2
(45) Date of Patent: Jan. 17, 2017

(54) TRANSLATION LOOKASIDE BUFFER ENTRY SYSTEMS AND METHODS

(71) Applicant: NVIDIA Corporation, Santa Clara, CA (US)

(72) Inventors: Alexander Klaiber, Mountain View, CA (US); Guillermo Juan Rozas, Los Gatos, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 605 days.

(21) Appl. No.: 13/831,176

(22) Filed: Mar. 14, 2013

(65) Prior Publication Data

US 2014/0281259 A1    Sep. 18, 2014

(51) Int. Cl.
G06F 12/00 (2006.01)
G06F 12/08 (2016.01)
G06F 12/10 (2016.01)

(52) U.S. Cl.
CPC ....... *G06F 12/0891* (2013.01); *G06F 12/0862* (2013.01); *G06F 12/1027* (2013.01)

(58) Field of Classification Search
CPC .............. G06F 12/0862; G06F 12/0891; G06F 12/1027
See application file for complete search history.

(56) References Cited

U.S. PATENT DOCUMENTS

| | | | |
|---|---|---|---|
| 5,487,146 A | 1/1996 | Guttag et al. | |
| 5,721,855 A | 2/1998 | Hinton et al. | |
| 5,870,582 A | 2/1999 | Cheong et al. | |
| 5,956,753 A * | 9/1999 | Glew et al. | 711/205 |
| 6,519,694 B2 | 2/2003 | Harris | |
| 7,010,648 B2 | 3/2006 | Kadambi et al. | |
| 7,062,631 B1 | 6/2006 | Klaiber et al. | |

(Continued)

FOREIGN PATENT DOCUMENTS

| | | |
|---|---|---|
| CN | 1519728 | 8/2004 |
| CN | 1629799 | 6/2005 |

(Continued)

OTHER PUBLICATIONS

Adve, S. et al., "Shared Memory Consistency models: A Turorial", WRL Research Report 95/7, Western Digital Laboratory, Sep. 1995, 32 pages.

(Continued)

*Primary Examiner* — Aracelis Ruiz

(57) ABSTRACT

Presented systems and methods can facilitate efficient information storage and tracking operations, including translation look aside buffer operations. In one embodiment, the systems and methods effectively allow the caching of invalid entries (with the attendant benefits e.g., regarding power, resource usage, stalls, etc), while maintaining the illusion that the TLBs do not in fact cache invalid entries (e.g., act in compliance with architectural rules). In one exemplary implementation, an "unreal" TLB entry effectively serves as a hint that the linear address in question currently has no valid mapping. In one exemplary implementation, speculative operations that hit an unreal entry are discarded; architectural operations that hit an unreal entry discard the entry and perform a normal page walk, either obtaining a valid entry, or raising an architectural fault.

20 Claims, 4 Drawing Sheets

(56) References Cited

U.S. PATENT DOCUMENTS

| | | | |
|---|---|---|---|
| 7,117,330 | B1 | 10/2006 | Alverson et al. |
| 7,194,604 | B2 | 3/2007 | Bigelow et al. |
| 7,752,627 | B2 | 7/2010 | Jones et al. |
| 7,873,793 | B1 | 1/2011 | Rozas et al. |
| 7,890,735 | B2 | 2/2011 | Tran |
| 8,035,648 | B1 | 10/2011 | Wloka et al. |
| 8,707,011 | B1 | 4/2014 | Glasco et al. |
| 2003/0018685 | A1 | 1/2003 | Kalafatis et al. |
| 2004/0128448 | A1 | 7/2004 | Stark et al. |
| 2005/0055533 | A1 | 3/2005 | Kadambi et al. |
| 2005/0138332 | A1 | 6/2005 | Kottapalli et al. |
| 2005/0154831 | A1 | 7/2005 | Steely et al. |
| 2006/0010309 | A1 | 1/2006 | Chaudhry et al. |
| 2006/0095678 | A1 | 5/2006 | Bigelow et al. |
| 2006/0149931 | A1 | 7/2006 | Haitham et al. |
| 2006/0174228 | A1 | 8/2006 | Radhakrishnan et al. |
| 2006/0277398 | A1 | 12/2006 | Akkary et al. |
| 2007/0204137 | A1 | 8/2007 | Tran |
| 2009/0019317 | A1 | 1/2009 | Quach et al. |
| 2009/0327661 | A1 | 12/2009 | Sperber et al. |
| 2010/0205402 | A1 | 8/2010 | Henry et al. |
| 2010/0205415 | A1 | 8/2010 | Henry et al. |
| 2012/0023359 | A1 | 1/2012 | Edmeades et al. |
| 2012/0089819 | A1 | 4/2012 | Chaudhry et al. |
| 2014/0082291 | A1 | 3/2014 | Van Zoeren et al. |
| 2014/0136891 | A1 | 5/2014 | Holmer et al. |
| 2015/0026443 | A1 | 1/2015 | Kumar et al. |

FOREIGN PATENT DOCUMENTS

| | | |
|---|---|---|
| CN | 1831757 | 9/2006 |
| EP | 0671718 | 9/1995 |
| GB | 2287111 | 9/1995 |
| TW | 1263938 | 10/2006 |
| TW | 1275938 | 3/2007 |
| TW | 200723111 | 6/2007 |
| TW | 200809514 | 2/2008 |
| TW | 1315488 | 10/2009 |
| TW | 1425418 | 2/2014 |

OTHER PUBLICATIONS

Chaudry, S. et al., "High-Performance Throughput Computing," Micro, IEEE 25.3, pp. 32-45, May, 2005, 14 pages.

Dehnert, et al., the Transmeta Code Morphing Software: using speculation, recovery, and adaptive retranslation to address real-life challenges, Mar. 23, 2003, IEEE, CGO '03 Proceedings of the international symposium on Code generation and optimization: feedback-directed and runtime optimization, pp. 15-24.

Dundas, J. et al., "Improving Date Cache Performance by Pre-executing Instructions Under a Cache Miss", Proceedings of the 1997 International Conference on Supercomputing, Jul. 1997, 9 pages.

Ekman, M. et al., "Instruction Categorization for Runahead Operation", U.S. Appl. No. 13/708,544, Filed Dec. 7, 2012, 2 Pages.

Ekman, M. et al., "Selective Poisoning of Data During Runahead", U.S. Appl. No. 13/662,171, Filed Oct. 26, 2012, 33 pages.

Holmer, B., et al., "Managing Potentially Invalid Results During Runahead", U.S. Appl. No. 13/677,085, filed Nov. 14, 2012, 29 pages.

Intel Itanium Architecture Software Developer's Manual, Intel, http://www.intel.com/design/itanium/manuals/iasdmanual.htm, 1 page.

Mutlu, 0. et al. "Runahead Execution: An Alternative to Very large Instruction Windows for Out-of-order Processors," This paper appears in: "High-Performance Computer Architecture," Feb. 8-12, 2003, 13 pages.

Nvidia Corp. Akquirierung spekulativer Genehmigung jur gemeinsam genutzten Speicher, Mar. 20, 2014, SW102013218370 A1, German Patent Office, All Pages.

Rozas, Guillermo J. et al., "Queued Instruction Re-Dispatch After Runahead," U.S. Appl. No. 13/730,407, Filed Dec. 28, 2012, 36 pages.

Rozas, J. et al., "Lazy Runahead Operation for a Microprocessor", U.S. Appl No. 13/708,645, filed Dec. 7, 2012, 32 pages.

Wikipedia article, "Instruction Prefetch," https://en.wikipedia.org/wiki/Instruction_prefetch, downloaded May 23, 2016.

Wikipedia article, "x86," https://en.wikipedia.org/wiki/X86, downloaded May 23, 2016.

\* cited by examiner

200

```
Determining a Category for a Memory Operation, Wherein
the Category Includes at Least One of an Architectural
Category Memory Operation and a Speculative Category
             Memory Operation        210
```

```
  Performing a Cache Process, Including Handling
Speculative Memory Operation Invalid Page Walk
      Responses with Unreal Entry Indicators
                                        220
```

FIG. 2

TRANSLATION LOOKASIDE BUFFER ENTRY SYSTEMS AND METHODS

FIELD OF THE INVENTION

The present invention relates to information storage. In particular, the present invention relates to a system and method for tracking caching of address translations.

BACKGROUND OF THE INVENTION

Electronic systems and circuits have made a significant contribution towards the advancement of modern society and are utilized in a number of applications to achieve advantageous results. Numerous electronic technologies such as digital computers, calculators, audio devices, video equipment, and telephone systems have facilitated increased productivity and reduced costs in analyzing and communicating data in most areas of business, science, education and entertainment. These activities often involve storage of information. The manner in which the electronic devices perform storage operations can have a significant impact on performance and end results. However, traditional attempts at information storage have many limitations and can be very complex and complicated.

In modern microprocessors, the CPU execution core may speculatively execute memory LOAD instructions even through it is not known at the time of the speculative execution whether: (a) the LOAD instruction actually needs to be executed (as opposed to being the result of, e.g., a branch misprediction) and/or (b) the address used by the LOAD instruction has the architecturally correct value. The speculation can occur implicitly in hardware as a result of speculative execution in processors (e.g., related to out-of-order processing, in-order processing, pipeline processing, branch prediction processing, etc.), or it can be explicit in the software, through mechanisms such as the speculative loads of the Intel Itanium architecture (e.g., http://www.inntel.com/design/itanium/manuals/iiasdmanual.htm). In addition, prefetch operations (e.g., including pre-fetches inserted by semi-autonomous hardware engines such as stream-detections pre-fetchers, etc.) can be considered a form of speculative load.

Some traditional software code paradigms may include loading a value from memory conditional on some check. The aim of the check might be to guard against dereferencing illegal addresses. Due to speculation, however, the LOAD (corresponding to dereferencing the pointer) may execute before the condition and/or corresponding conditional branch have been evaluated and/or resolved, and thus the LOAD may speculatively reference an illegal address. Often, it is the case that "invalid" addresses (e.g., in particular the "null" page at linear address zero, etc.) are not given legal mappings by the operating system (e.g., the page is marked as "not present", etc.), with the intent of exposing as page faults any "bad" pointer dereferencing or missing pointer validity checks by the software. In many conventional architectures (e.g., x86 or ARM), the hardware TLBs are not permitted to cache not-present entries; this typically manifests itself as an architectural rule that when an operating system changes a page mapping from invalid to valid, it need not invalidate the TLBs (e.g., which by decree do not hold invalid mappings, etc.).

However, when TLBs are not allowed to cache invalid entries, successive references to a "bad" address typically miss in the TLB, and generate separate requests ("page walk requests"), aimed at producing a valid mapping (yet ultimately fail to produce a valid TLB entry). These requests typically consume power, may introduce additional stalls into the system, and/or complicate fault handling. It may be desirable to "squash" these requests early, but traditional approaches directed at actually caching invalid mappings in the TLB (which might attempt to achieve an early "squash") typically violate the architectural rule alluded to above.

SUMMARY

Presented systems and methods can facilitate efficient information storage and tracking operations, including translation look aside buffer operations. In one embodiment, the systems and methods effectively allow the caching of invalid entries, while maintaining the illusion that the TLBs do not in fact cache invalid entries. The effective allowance of caching of invalid entries can include the attendant benefits (e.g., regarding power, resource usage, stalls, etc.), while the illusion of not caching invalid entries effectively acts in compliance with architectural rules. In one embodiment, an "unreal" TLB entry effectively serves as a hint that the linear address in question currently has no valid mapping. In one exemplary implementation, speculative operations that hit an unreal entry are discarded while architectural operations that hit an unreal entry discard the entry and perform a normal page walk (e.g., either obtaining a valid entry, or raising an architectural fault, etc.).

DESCRIPTION OF THE DRAWINGS

The accompanying drawings, which are incorporated in and form a part of this specification, illustrate embodiments of the invention by way of example and not by way of limitation. The drawings referred to in this specification should be understood as not being drawn to scale except if specifically noted.

FIG. 2 is a block diagram of an exemplary method in accordance with one embodiment of the present invention.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Presented systems and methods can facilitate efficient information storage and tracking operations, including translation look aside buffer operations. In one embodiment, the systems and methods effectively allow the caching of invalid entries, while maintaining the illusion that the TLBs do not in fact cache invalid entries. The effective allowance of caching of invalid entries can include the attendant benefits (e.g., regarding power, resource usage, stalls, etc.), while the illusion of not caching invalid entries effectively acts in compliance with architectural rules. In one embodiment, an "unreal" TLB entry effectively serves as a hint that the linear address in question currently has no valid mapping. In one exemplary implementation, speculative operations that hit an unreal entry are discarded while architectural operations that hit an unreal entry discard the entry and perform a normal page walk (e.g., either obtaining a valid entry, or raising an architectural fault, etc.).

Figure 1:
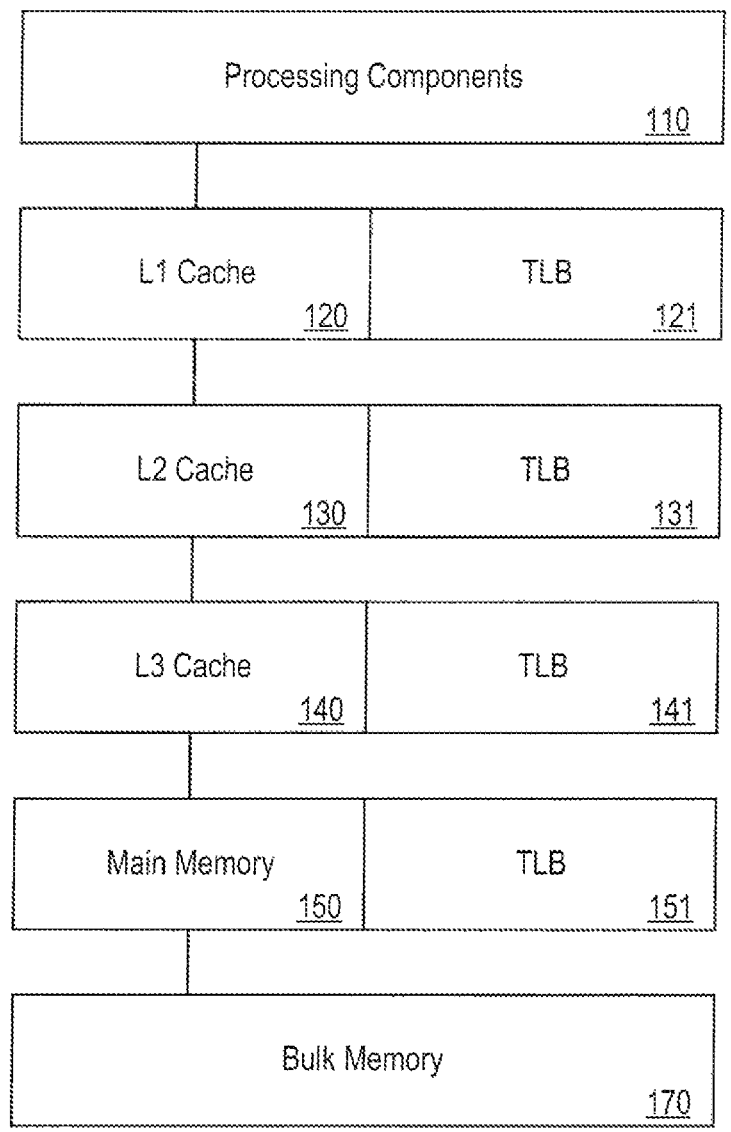
FIG. 1 is a block diagram of exemplary memory architecture in accordance with one embodiment of the present invention.

FIG. 1 is a block diagram of exemplary memory architecture 100 in accordance with one embodiment of the present invention. In one embodiment, memory architecture 100 includes an information state external tracking memory system. Memory architecture 100 includes levels 110, 120, 130, 140, 150 and 170. Levels 110, 120, 130, 140 and 150 are storage levels. In one exemplary implementation, storage level 110 can be considered a processing level (e.g., including registers, flip flops, etc.), storage levels 120, 130 and 140 can be considered a cache level (e.g., including L1 cache, L2 cache, L3 cache, etc.), storage level 150 can be considered a backing store or main memory level (e.g., RAM, DRAM, etc.) and storage level 170 can be considered bulk storage (e.g., hard disk, CD, etc.). The storage levels 110, 120, 130, 140 and 150 include TLB components 121, 131, 141 and 151.

A translation lookaside buffer (TLB) performs address translation operations. In one embodiment, a TLB is capable of making "unreal" ("no valid mapping") hint entries. There can be different reasons for what constitutes an "invalid mapping" (e.g., in ARM architecture: "not present" and "AccessFlag bit not set", etc.). In one embodiment, speculative TLB misses make unreal entries if the page walk returns an invalid response. A speculative memory operation that hits an unreal TLB entry can be immediately marked as "failed". In one exemplary implementation speculative memory operations can turn architectural, at which point they are re-issued as architectural if they have been previously marked as failed.

In one embodiment, the unreal entries are not kept at the innermost TLB but in another component (e.g., a second-level TLB, etc.). In one embodiment, the unreal entries are kept at the innermost TLB. An architectural TLB miss can make an unreal entry if the page walk response is invalid. Architectural memory operations can discard the preexisting unreal entry at TLB hit time. In one exemplary implementation, architectural memory operations discard/overwrite the preexisting unreal entry when the new page walk returns its response. In one embodiment prefetches are treated as speculative loads are squashed early without having to do page walk.

FIG. 2 is a block diagram of an exemplary method 200 in accordance with one embodiment of the present invention.

In block 210, memory operations are classified into two categories. In one embodiment, the categories include at least an architectural category memory operation and a speculative category memory operation. In an architectural category memory operation, the memory operation is known to be part of the "architectural" execution path (e.g., not the result of a branch misprediction; a sequence leading to a memory wherein the sequence has no potential for faults to divert execution before reaching the operation, etc). In a speculative category memory operation it is not yet known to be architectural or not. In some systems, speculative instructions may later prove to have been architectural; in others the classification does not change.

In block 220, a cache process is performed, including handling speculative memory operation invalid page walk responses with unreal entry indicators. In one embodiment, an "unreal" TLB entry effectively serves as a hint that the linear address in question currently has no valid mapping.

Figure 3:
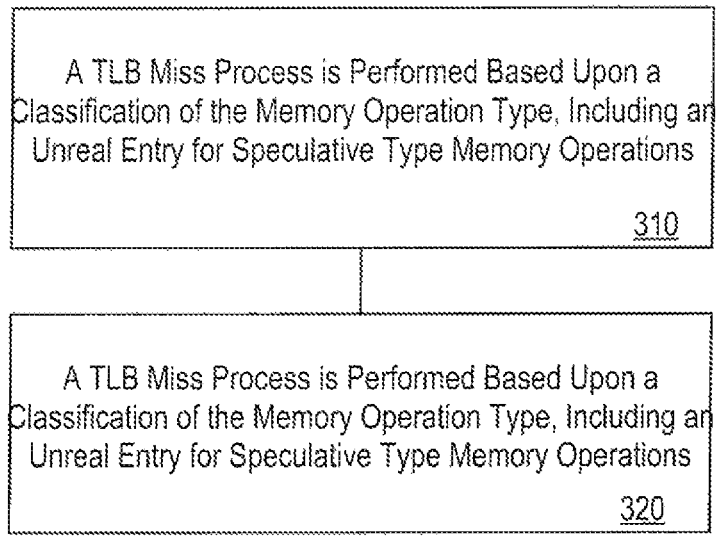
FIG. 3 is a block diagram of an exemplary computer system upon which embodiments of the present invention can be implemented.

FIG. 3 is a block diagram of an exemplary cache process 300 in accordance with one embodiment of the present invention.

In block 310, a TLB miss process is performed based upon a classification of the memory operation type, including an unreal entry for speculative type memory operations. In one exemplary implementation, an unreal entry TLB miss process returns a different response depending on how the triggering memory operation is classified (e.g., in block 210, etc.). In one embodiment, an unreal TLB entry process is performed (e.g., block 311, etc.) if a speculative category memory operation is determined (e.g., in block 210, etc.). In one embodiment, a page fault process is performed (e.g., in block 312, etc.) if an architectural category memory operation is determined (e.g., in block 210, etc.). In one embodiment, the page fault process includes performing whatever page fault action the architecture requires and a TLB entry is not made. In one exemplary implementation, this is typical handling of TLB misses where the page walk returns an invalid response.

In block 320, an unreal entry TLB hit process is performed based upon a classification of the memory operation type, including resolving a hit on an unreal entry. In one exemplary implementation, an unreal entry TLB hit process returns a different response depending on how the triggering memory operation is classified (e.g., in block 210, etc.). If the memory operation is classified as architectural then handle an architectural hit as an architectural TLB miss (e.g., as described above in block 310; effectively discarding or overwriting the unreal entry, etc.). If the memory operation is classified as speculative, the memory operation is treated as "failed" without requesting an additional page table walk. Should the memory operation later become an architectural hit, re-issue it as architectural miss.

Figure 4:
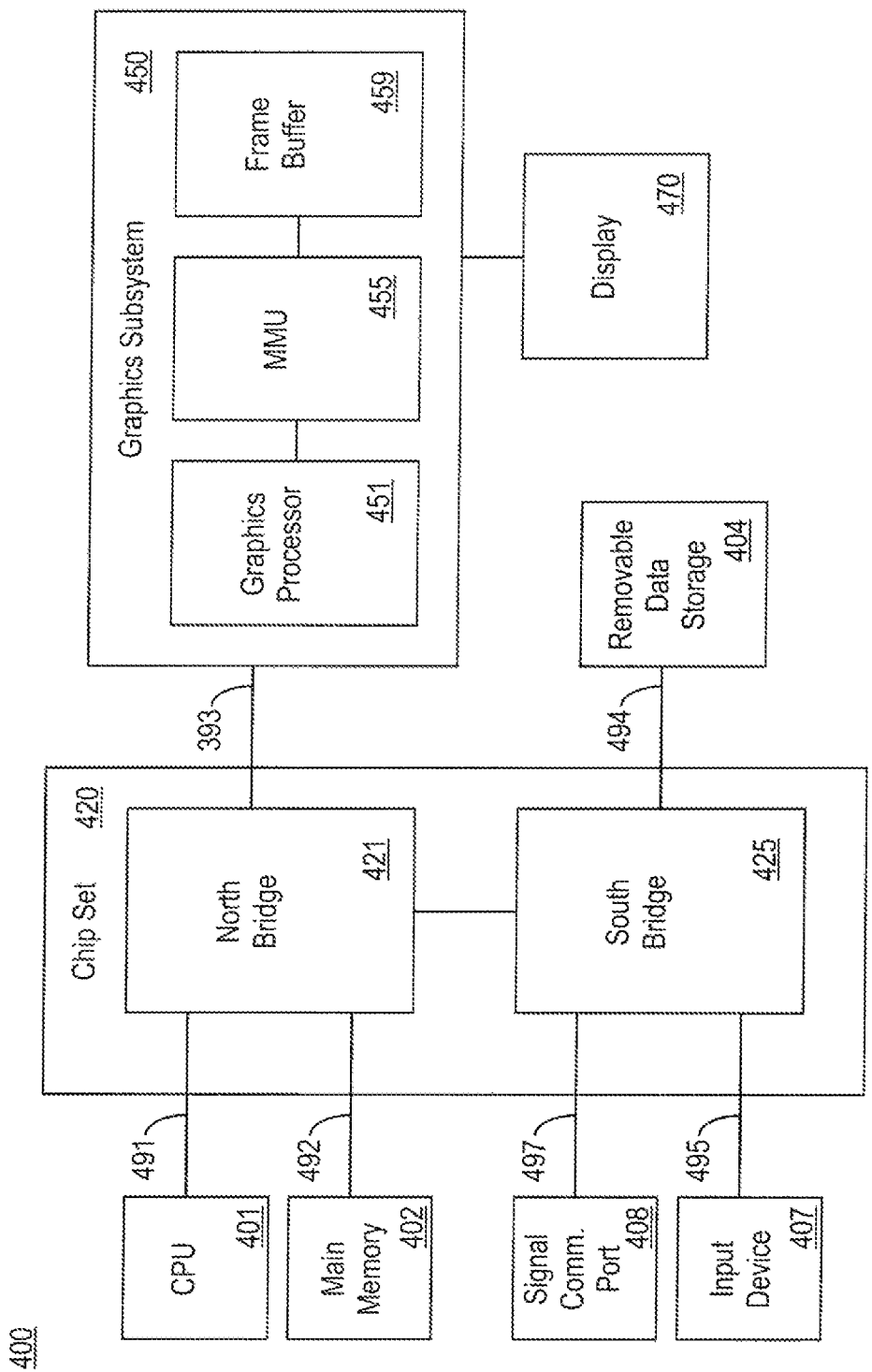
FIG. 4 is a block diagram of an exemplary computer system, one embodiment of a computer system upon which embodiments of the present invention can be implemented.

FIG. 4 is a block diagram of a computer system 400, one embodiment of a computer system upon which embodiments of the present invention can be implemented. Computer system 400 includes central processor unit 301, main memory 402 (e.g., random access memory), chip set 420 with north bridge 421 and south bridge 425, removable data storage device 404, input device 407, signal communications port 408, and graphics subsystem 450 which is coupled to display 470. Computer system 440 includes several busses for communicatively coupling the components of computer system 400. Communication bus 491 (e.g., a front side bus) couples north bridge 421 of chipset 420 to central processor unit 401. Communication bus 492 (e.g., a main memory bus) couples north bridge 421 of chipset 420 to main memory 402. Communication bus 493 (e.g., the Advanced Graphics Port interface) couples north bridge of chipset 420 to graphic subsystem 450. Communication buses 494-497 (e.g., a PCI bus) couple south bridge 425 of chip set 420 to removable data storage device 404, input device 407, signal communications port 408 respectively.

Graphics subsystem 450 includes graphics processor 451, memory management unit 455 and graphics buffer 459.

The components of computer system 400 cooperatively operate to perform a variety of processing tasks and facilitate efficient memory accesses. Communications bus 491, 492, 493, 494, 495 and 497 communicate information. Central processor 401 processes information. Main memory 402 stores information and instructions for the central processor 401. Removable data storage device 404 also stores information and instructions (e.g., functioning as a large information reservoir). Input device 406 provides a mechanism for inputting information and/or for pointing to or highlighting information on display 470. Signal communication port 408 provides a communication interface to exterior devices (e.g., an interface with a network). Display device 470 displays information in accordance with data stored in frame buffer 459. Graphics processor 451 processes graphics commands from central processor 401 and provides the resulting data to graphics buffers 459 for storage and retrieval by display monitor 470. Memory management unit 455 handles the memory access requests between graphics processor 451 and graphics buffers 459. It is appreciated that similar memory management units can be implemented to facilitate efficient and independent access requests to other memory components of computer system 400, including main memory 402 and bulk data storage 404.

It is appreciated that the present invention can be implemented in a variety of embodiments. In one exemplary implementation the present invention can be utilized in processing systems utilized to provide a variety of graphics applications including video games. For example, the present invention can be utilized in a game console, personal computer, personal digital assistant, cell phone or any number of platforms for implementing a video game. It is also appreciated that references to video game application implementations are exemplary and the present invention is not limited to these implementations.

Portions of the detailed description are presented and discussed in terms of a method. Although steps and sequencing thereof are disclosed in figures herein describing the operations of this method, such steps and sequencing are exemplary. Embodiments are well suited to performing various other steps or variations of the steps recited in the flowchart of the figure herein, and in a sequence other than that depicted and described herein.

Some portions of the detailed description are presented in terms of procedures, steps, logic blocks, processing, and other symbolic representations of operations on data bits that can be performed within a computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps include physical manipulations of physical quantities. Usually, though not necessarily, these quantities take the form of electrical, magnetic, optical or quantum signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "processing", "computing", "calculating", "determining", "displaying", "accessing," "writing," "including," "storing," "transmitting," "traversing," "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Some embodiments may be described in the general context of computer-executable instructions, such as program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method comprising:
    determining a category for a memory operation, wherein the category includes at least one of an architectural category memory operation and a speculative category memory operation; and
    performing a TLB cache process, including handling speculative memory operation invalid page walk responses with unreal entry indicators, wherein the TLB cache process includes:
        performing a page fault process if the category is determined to be an architectural category memory operation; and
        performing an unreal TLB entry process if the category is determined to be a speculative category memory operation.

2. The method of claim 1 wherein the page fault process includes performing architecturally required action when a TLB entry is not found and when a TLB page walk returns an invalid response.

3. The method of claim 2 wherein an architectural category includes a memory operation known to not be the result of a branch misprediction.

4. The method of claim 2 wherein an architectural category includes a sequence leading to a memory operation wherein the sequence has no potential for faults to divert execution before reaching the operation.

5. The method of claim 4 wherein a speculative instruction may later prove to have been architectural.

6. The method of claim 4 wherein a speculative instruction classification does not change.

7. The method of claim 1 wherein an architectural category includes a memory operation known to be part of the "architectural" execution path.

8. The method of claim 1 wherein a speculative category memory operation is not initially known to be architectural or not.

9. A system comprising:
a processor for performing processing operations;
a memory for storing information for said processor; and
a translation look aside buffer including unreal entries that provide hints of invalid mapping entries, wherein an architectural TLB miss makes an unreal entry if a page walk response is invalid.

10. The system of claim 9 wherein said invalid mapping entries include a not present condition and an access flag bit not set.

11. The system of claim 9 wherein speculative operations that hit an unreal entry are discarded while architectural operations that hit an unreal entry discard the unreal entry and perform a normal page walk.

12. The system of claim 11 wherein a speculative memory operation that hits an unreal TLB entry is immediately marked as "failed".

13. The system of claim 12 wherein speculative memory operations can turn architectural, at which point they are re-issued as architectural if they have been previously marked as failed.

14. The system of claim 11 where unreal entries are kept in the innermost TLB or in another TLB.

15. The system of claim 11 wherein architectural memory operations discard the preexisting unreal entry at TLB hit time.

16. The system of claim 11 wherein architectural memory operations discard/overwrite the preexisting unreal entry when the new page walk returns its response.

17. The system of claim 11 wherein architectural memory operations discard/overwrite the preexisting unreal entry when the new page walk returns a valid response.

18. The system of claim 11 wherein prefetches are treated as speculative loads.

19. A non-transitory computer readable medium including instructions for directing a processor to perform a TLB method, the TLB method comprising:
determining a category for a memory operation, wherein the category includes at least one of an architectural category memory operation and a speculative category memory operation; and
performing a TLB miss resolution process, wherein a resolution action is based at least in part upon the results of the determining a category for a memory operation, including handling speculative memory operation invalid page walk responses with unreal entry indicators.

20. The non-transitory computer readable medium of claim 19 wherein the page fault process includes performing architecturally required action when a TLB entry is not found and when a TLB page walk returns an invalid response.

* * * * *